United States Patent [19]

Whitney et al.

[11] Patent Number: 5,021,216
[45] Date of Patent: Jun. 4, 1991

[54] METHOD OF REMOVING AND CRYSTALLIZING CATION RESIN ABSORBED CALCIUM AND MAGNESIUM

[75] Inventors: Solon G. Whitney, Bartow, Fla.; Harold J. Kleiss, Cary, N.C.

[73] Assignee: American Pembroke, Inc., Bartow, Fla.

[21] Appl. No.: 525,091

[22] Filed: May 17, 1990

[51] Int. Cl.⁵ ............................ C08J 5/20; B01J 49/00
[52] U.S. Cl. ........................................ 521/26; 210/669; 210/677; 210/687
[58] Field of Search ................. 210/677, 687, 669; 521/26

[56] References Cited

U.S. PATENT DOCUMENTS

| | | | |
|---|---|---|---|
| 4,363,880 | 12/1982 | Whitney | 521/26 |
| 4,385,993 | 5/1983 | Hedrick et al. | |
| 4,493,907 | 1/1985 | Hedrick et al. | |
| 4,652,352 | 3/1987 | Saieva | 204/105 R |
| 4,721,519 | 1/1988 | Thomas et al. | |
| 4,861,490 | 8/1989 | Morris | 210/669 |

OTHER PUBLICATIONS

"industrial Scale-Up of a Phosphoric Acid Purification Process", by James E. Van Wyk, Nov. 11, 1986, American Institute of Chemical Engineers.

Primary Examiner—Joseph L. Schofer
Assistant Examiner—Fred Zitomer
Attorney, Agent, or Firm—Tilton, Fallon, Lungmus & Chestnut

[57] ABSTRACT

An improved method is provided for regenerating cation exchange resin loaded with metal ion impurities from wet process phosphoric acid. A regenerant solution is used composed of a mixture of ammonium sulfate and sulfuric acid in predetermined proportions which are maintained during recycle of the regenerant. This solution is preferably formed from anhydrous ammonia and sulfuric acid. Calcium and magnesium sulfates are selectively crystallized from the regenerant solution in the form of readily filterable crystals.

7 Claims, 3 Drawing Sheets

METHOD OF REMOVING AND CRYSTALLIZING CATION RESIN ABSORBED CALCIUM AND MAGNESIUM

FIELD OF INVENTION

The general field of this invention is the removal of metal impurities, especially magnesium, from wet process phosphoric acid. More particularly, the invention is concerned with methods of removing and crystallizing phosphoric acid impurities adsorbed on cation exchange resin.

BACKGROUND OF INVENTION

In the wet process for producing phosphoric acid, phosphate rock is digested with concentrated sulfuric acid. The resulting phosphoric acid contains metal impurities which it may be desired to remove or reduce before the phosphoric acid is converted into fertilizers. Magnesium is a particularly troubling contaminant. High concentrations of magnesium in phosphoric acid prohibit the formulation of various grades of fertilizer which are necessary for agricultural crops.

The magnesium problem is becoming acute because a large part of the remaining phosphate rock reserves in the United States, as well as and in other countries, contains unacceptably high levels of magnesium. If such phosphate rock is used to prepare phosphoric acid, the acid will contain so much magnesium that it cannot be used for high grade fertilizers. One expedient has been to blend a high magnesium phosphate rock with phosphate rock of lower magnesium content, but this is a limited and temporary answer to the problem.

Systems employing cation exchange resins for removing metal ions have been proposed for treatment of wet process phosphate rock. A particular objective of such systems is the reduction of the content of magnesium in the acid. Desireably, other metal ions are also reduced, especially calcium.

Folded bed exchange systems, which are also called pulsed-bed systems, have been proposed for treatment of wet process phosphoric acid. (See, for example, U.S. Pat. Nos. 4,228,001 and 4,280,904.) A pulsed-bed system removes increments or pulse amounts of resin from a loading column and transfers the increments through a regeneration and recycle apparatus. One system of this kind is described in U.S. Pat. No. 4,385,993.

For removal of calcium and magnesium ions from a cation exchange resin, regeneration procedures are needed, for example, as described in U.S. Pat. Nos. 4,363,880 and 4,493,907. As there described, calcium is first removed from the resin with a recycled 20 to 50% concentration sulfuric acid. Thereafter, the magnesium ion is removed using a higher sulfuric acid concentration. The removed calcium and magnesium ion are separately crystallized as sulfate salts.

Technical feasibility of the pulsed-bed ion exchange system described, in the cited U.S. Pat. Nos. 4,385,993, 4,363,880 and 4,493,907 has been established. A semicommercial scale plant using this technology was built and demonstrated in Tunisia.

A by-product of the regeneration and crystallization system is a high concentration sulfuric acid which can be used in a phosphoric acid plant to digest phosphate rock. (See "Industrial Scale-Up of a Phosphoric Acid Purification Process", by James E. Van Wyk, dated Nov. 11, 1986, published by The American Institute of Chemical Engineers, Florida USA).

It is sometimes desirable to treat wet process phosphoric acid by cation exchange to reduce metal impurities at locations other than those associated with a phosphoric acid plant. In such an application, it would be undesirable to have by-product sulfuric acid. This could result in a waste disposal problem. A preferred objective in such a situation is to achieve regeneration with a treating solution which can be continuously reused. A recycle system for this purpose is described in U.S. Pat. No. 4,861,490. The resin regeneration solution is saturated ammonium sulfate, the adsorbed magnesium and calcium and other metal ions being exchanged for ammonium ions. The removed metal ions are crystallized as their sulfate salts. Make-up ammonium sulfate is added to the supernatant from the crystallizer before it is recycled, or, alternatively, the ammonium sulfate is to be formed in situ by adding equivalent amounts of ammonia and sulfuric acid.

SUMMARY OF INVENTION

During the development of the present invention experiments were carried out in which it was attempted to use saturated ammonium sulfate for regeneration of a cation resin containing adsorbed calcium and magnesium ions. Saturated ammonium sulfate has a pH of around 4.2. When using saturated ammonium sulfate, it was found that crystallization of the calcium sulfate and ammonium sulfate was difficult to control. In particular, it was found to be difficult to produce crystals which were filterable. A very fine precipitate was obtained which remained suspended.

In earlier experiments, it had been found that simultaneous removal of calcium and magnesium from a cation exchange resin could not be efficiently carried out with a recycled sulfuric acid regenerant. Calcium can be removed and crystallized to calcium sulfate at a low to moderate concentration of sulfuric acid in a recycle system. Such concentrations are not effective for crystallizing magnesium or other metal ions because of high solubility of the ions in dilute sulfuric acid. For precipitation of magnesium ions, it was found desirable to use a more highly concentrated sulfuric acid, as described in U.S. Pat. No. 4,493,907.

In carrying out further experiments, it was discovered that a single stage resin regeneration can be effectively achieved with improved process control by employing a novel regenerant solution. This solution is preferably made from sulfuric acid and anhydrous ammonia combined in predetermined proportions to yield the proper concentration of ammonium sulfate and free sulfuric acid. Solid ammonium sulfate and sulfuric acid can also be used. However, it is believed important to avoid use of saturated ammonium sulfate solution, which can cause a premature precipitation of solids. This may occur in the resin bed immediately after exchange of the ammonium ions for the metal ions. With the composite regenerant solution and method of this invention, slightly supersaturated conditions can be maintained for calcium sulfate and magnesium sulfate within the resin increment being treated. This does not result in premature precipitation because of the high velocity and large volume flow of the regenerant. After passing through the resin bed, the slightly supersaturated regenerant solution is transferred to a crystallizer, wherein the calcium and magnesium ions are co-crystallized as sulfates. The resulting crystals are in readily filterable form.

If saturated ammonium sulfate is used without added sulfuric acid, the regenerant solution does not produce the best form of magnesium sulfate crystals. The preferred form, which is more readily filterable, comprises a complex of magnesium sulfate and ammonium sulfate. Large filterable crystals of this complex salt are readily obtained in increased concentrations of sulfuric acid with its corresponding low pH.

BRIEF DESCRIPTION OF DRAWINGS

The method of this invention is illustrated by the accompanying drawings.

DETAILED DESCRIPTION

Figure 1:
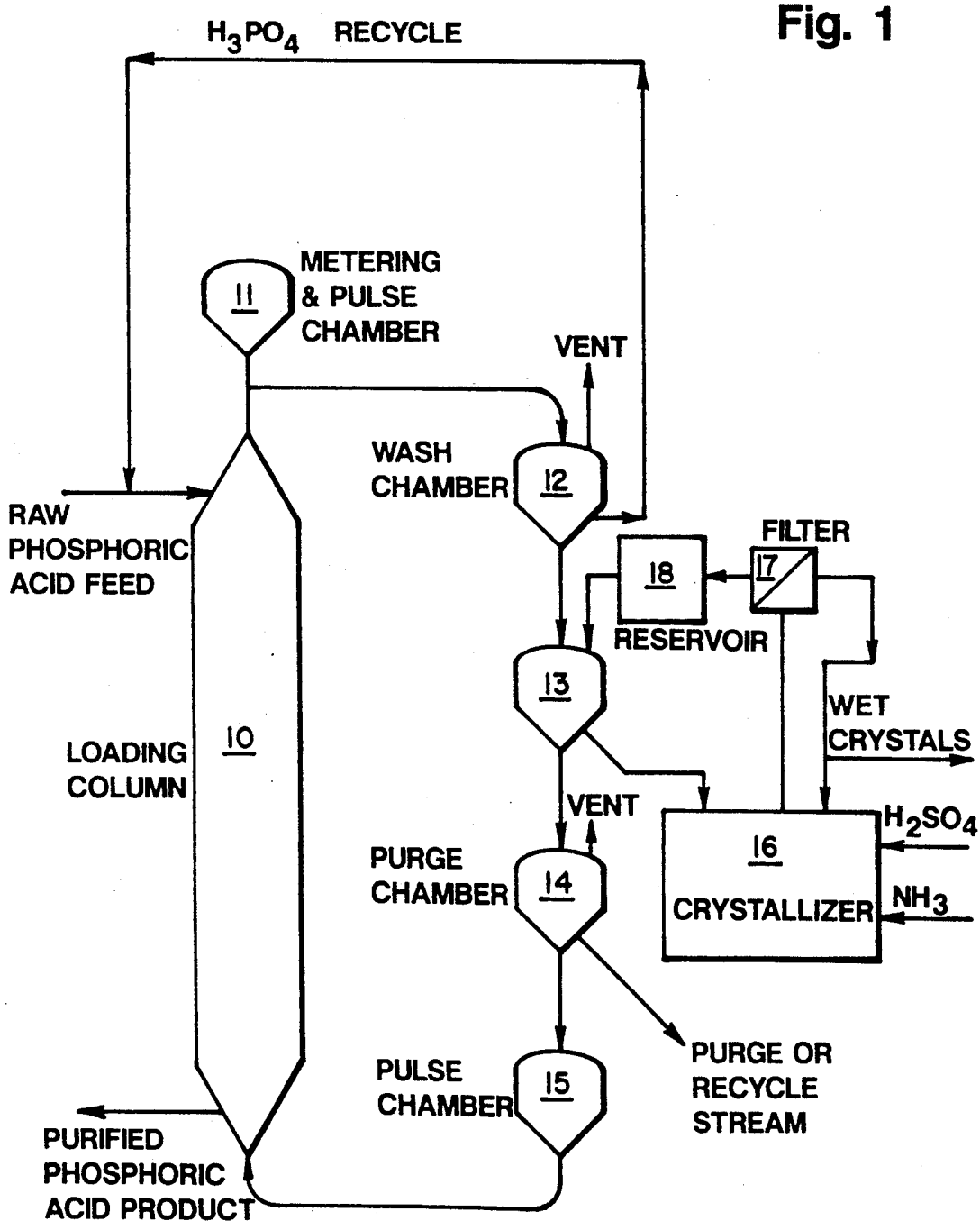
FIG. 1 is a diagrammatic showing of a pulsed-bed system for treating wet process phosphoric acid which includes the resin regeneration system of this invention.

Ion exchange resins for use in practicing the present invention are strong acid cation exchange resins preferably in the form of macroporous beads. The resins contain exchange sites which can be used in hydrogen ($H^+$), ammonium ($NH_4^+$), or mixed hydrogen-ammonium ($H^+/NH_4^+$) forms. The selected resin beads should have adequate mechanical strength for use in a pulsed-bed system, and they should be resistant to phosphoric and sulfuric acids and to osmotic shock as encountered in such a system. Styrene-base cation resins are especially suitable. For example, crosslinked polystyrene aryl sulfonate resins may be used. Examples of suitable commercial resins are Rohm and Hass C-26 or Dowex MSC-1 of Dow Chemical Company.

The crude wet process phosphoric acid to be treated may contain from about 20 to 40 weight percent $P_2O_5$, such as typically 28 to 32% $P_2O_5$. This crude phosphoric acid contains metal ion impurities. The principal metal ions to be removed are calcium and magnesium. Other metal ions may include cadmium, ferrous iron, sodium, potassium, as well as trivalent ions, ferric ions and aluminum ions. The removal of magnesium is a principal objective with a secondary objectives being removal of calcium.

Cadmium can be reduced through a treatment of a purge stream. For example, after crystallization of the calcium and magnesium sulfates and their separation from the supernatant, portions of the supernatant can be treated to precipitate cadmium sulfate, ferrous sulfate and small amounts of some other metal sulfates.

The resin regeneration and metal ion crystallization method of this invention is not limited to use with pulsed-bed systems. The method can also be applied to fixed resin beds, although less advantageously than in conjunction with a pulsed-bed system.

The method of this invention is characterized by use of a regenerant solution containing defined amounts of sulfuric acid and anhydrous ammonia to yield the proper concentration of ammonium sulfate and free sulfuric acid. It is preferred to form the ammonium sulfate in situ, but solid ammonium sulfate can be used to form part or all of the required $(NH_4)_2SO_4$. The amount of sulfuric acid on a weight percent basis can range from 5 to 50% of the regenerant solution when used in combination with ammonium sulfate amounts of 10 to 40% by weight. These percentages are based on the composite solution. In the preferred embodiments the regenerating solution contains from 15 to 25 weight percent $H_2SO_4$ and from 20 to 40 weight percent $(NH_4)_2SO_4$.

The pH of the regenerating solution should be below 3.0 and preferably below 2.0. Typical pH's are pH 1 and lower. The amount of sulfuric acid present should be sufficient to promote the precipitation of magnesium sulfate and calcium sulfate. With the conditions described the salts form large readily filterable crystals as they precipitate. The calcium sulfate is believed to be in the form of boussingaulite or similar complex salt, viz., as $(NH_4)_2SO_4 \cdot MaSO_4 \cdot x\ H_2O$, where x is 6, or part of the $H_2O$ is substituted with $H_2SO_4$. The calcium is believed to be crystallized as $CaSO_4 \cdot x\ H_2O$ where x is 2. The conditions used for the regenerant results in selective crystallization of the calcium and magnesium, that is, the cadmium and ferrous ions as well as sodium, potassium and trivalent ions can remain in solution and are removed with the supernatant.

Regeneration temperatures are not highly critical. The contacting of the regenerant solution with the resin beads may be carried out at a temperatures of from 40° to 125° F. Typically temperatures are in the range of about 70° to 105° F.

The degree of $(NH_4)_2SO_4$ saturation of the regenerant should be kept below 90%. In preferred operating conditions, the amount of $(NH_4)_2SO_4$ is below 85% of saturation. For example, from 65 to 75% $(NH_4)_2SO_4$ saturation is an advantageous concentration. These saturation values refer to the composite solution as contacted with the resin. It will be understood that solubility and saturation are relative to the temperature of the regenerant solution a applied to the resin.

DESCRIPTION OF PREFERRED EMBODIMENTS

The method of the present invention is preferably employed with the pulsed-bed cation exchange system illustrated in FIG. 1. The system as there shown includes a loading column 10 containing cation exchange resin beads in mixed hydrogen/ammonium ($H^+/NH_4^+$) form. Crude phosphoric acid feed is introduced to the top portion of column 10 and product phosphoric acid is removed from the bottom. Column 10 is operated as a pulsed-bed. Increments of resin are pushed out of the top of the column into metering and pulse chamber 11 by the introduction of a corresponding pulse of regenerant resin into the bottom of the column. The operation of a metering chamber is illustrated in U.S. Pat. No. 4,461,710. The metered resin increment in chamber 11 is transferred by gravity and air pressure to a wash chamber 12. In chamber 12, residual phosphoric acid is purged by compressed air introduction, being returned as an $H_3PO_4$ recycle to the crude phosphoric acid feed. The resin increment in chamber 12 can then be washed with a wash stream recycled from chamber 14. By adjustment of wash volume, the remaining phosphoric acid can be removed from the resin in a relatively pure form, suitable for addition to the feed phosphoric acid stream.

The resin increment is next transferred to regen chamber 13 wherein it is treated with the regenerant solution. After regeneration, the resin increment will be in mixed $H^+/NH_4^+$ form. It is transferred to purge chamber 14. Compressed air can be used to purge residual regeneration liquid that is discharged from chamber 14 as a waste purge or as a recycle stream. Water is added to wash the regenerant from the resin. The effluent stream from this wash may be a purge or recycled to the regenerant. Compressed air is used to reduce liquid on the resin. Product phosphoric acid is used to reduce the amount of water on the resin. The effluent from this stream is used as the wash in chamber 12. The resin is then washed by product phosphoric acid to pulse chamber 15, from which it is then pulsed into the bottom of column 10.

For purposes of the present invention, the resin regeneration system in addition to regen chamber 13 includes at least a crystallizer 16, a filter 17 or other solids-liquid separator device and a reservoir 18. The regenerant solution, having the sulfuric acid and ammonium sulfate concentrations previously described, is maintained in reservoir 18 from which it is passed through resin in regen chamber 13. Metal ions adsorbed on the resin are exchanged for hydrogen and ammonium ions. Calcium, magnesium and other metal ions are removed. The solution becomes slightly supersaturated with respect to the calcium and magnesium sulfates. It is important that the contact time between the regenerant solution and the resin be as short as possible to avoid formation of crystals within the resin bed.

The slightly supersaturated solution is passed rapidly from chamber 13 into crystallizer 16 in which the calcium and magnesium are crystallized as their sulfate salts. $H_2SO_4$ and $NH_3$ (anhydrous) are preferably introduced into the crystallizer as make-up reagents to maintain the desired concentration of sulfuric acid and ammonium sulfate in the reservoir 18. For start-up or to control heating of the supernatant solid ammonium sulfate can be used as a partial substitutute for the $NH_3$ and $H_2SO_4$.

Figure 2:
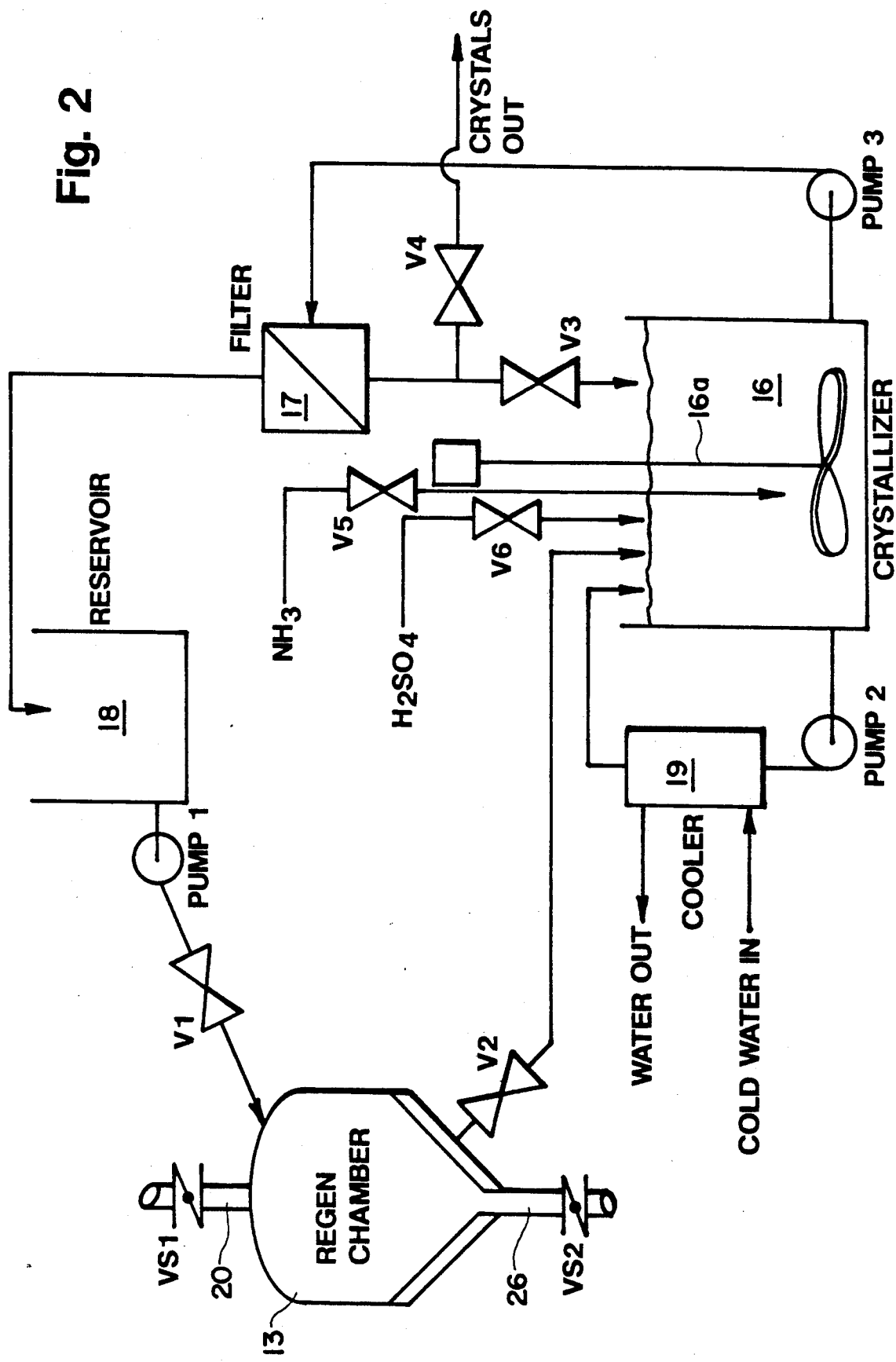
FIG. 2 is a more detailed illustration of the regeneration and crystallization system of this invention.

A more detailed embodiment is in FIG. 2. The crystalline slurry is removed from the bottom of crystallizer 13 and passed through filter 17. The crystals are discharged from the filter and the clarified supernatant is transferred to reservoir 18. Suitable automatic valves are provided for controlling the regeneration recycle circuit. These can include valve V1 between pump P1, which withdraws regenerant from reservoir 18 to transfer to regen chamber 13. Valve V2 controls the line on the bottom of chamber 13 to crystallizer 16. Inlet 20 is controlled by a solids handling valve VS1 which discharges resin into chamber 13. A resin discharge outlet 26 is equipped with a solids handling valve VS2 for discharging the regenerant resin from the bottom of the chamber 13.

Crystallizer 16 can be a forced circulation crystallizer in which a circulating magma is withdrawn from the bottom of the crystallizer by pump P2 for circulation through the indirect cooler 19. Cooling water inlets and outlets are provided for cooler 19. The crystallizer can be equipped with a motor driven agitator 16a. Crystalline slurry is withdrawn from the bottom of crystallizer 16 by pump P3 for passage through filter 17. Filtered solids are removed from filter and either returned to the crystallizer through valve V3, as needed, or removed from the recycle circuit through valve V4. The filtered liquid supernatant is transferred from filter 17 into reservoir 18. As required, additional $NH_3$ and $H_2SO_4$ are introduced to crystallizer 16, respectively, through the lines controlled by valves V5 and V6.

Representative temperature conditions for the crystallizer are in the range of 40° to 100° F. The temperature is maintained by the indirect heat exchange in cooler 19.

Figure 3:
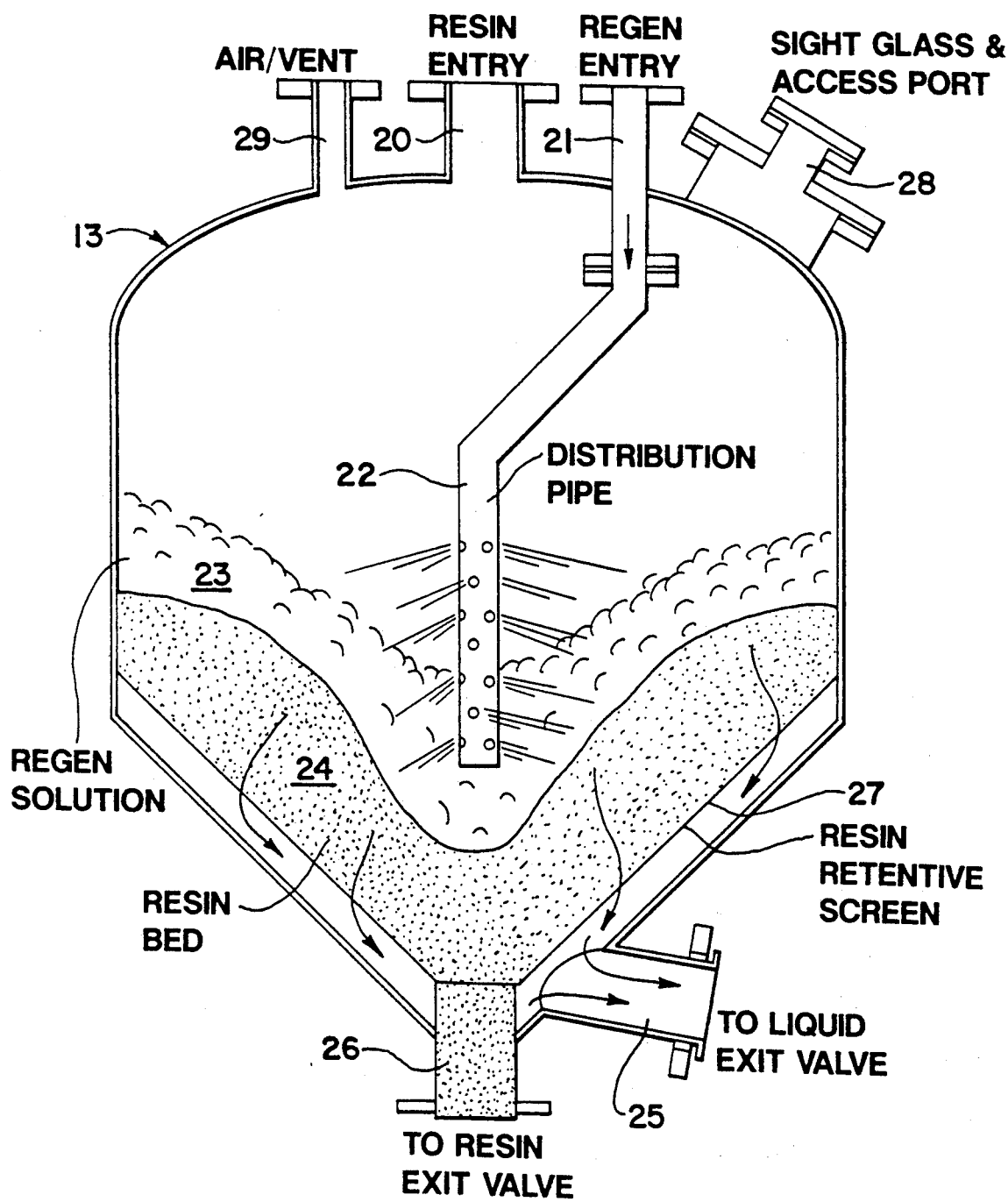
FIG. 3 is a cross sectional view of a regeneration apparatus which may be used in practicing the present invention.

FIG. 3 illustrates a preferred design of regen chamber 13. An increment of resin is introduced through a resin entry port 20 to form a bed partially filling the regen chamber. The regen solution is introduced at high velocity through distribution pipe 22, which has a sparger lower end portion with a series of outlet ports. Before the flow of regeneration solution is started, the lower portion of the distribution pipe will be within the top portion of the resin bed. As the flow of regenerating solution begins, the resin bed is redistributed to dished configurations as shown. The resin bed 24 is retained on a downwardly converging perforated support 27, which may be a conical screen. The regenerant, after passing through screen 27, exists through port 25. On completion of regeneration, the resin is removed through bottom port 26. The upper portion of regen chamber 13 may be provided with sight glass and access port 28 and an air vent 29.

As shown in FIG. 3, the entering regenerating solution, designated as 23, is distributed over the upper surface of the dished resin bed 24. The resin is subjected to a large volume of the regenerating solution in a short time. Each increment of resin being regenerant may comprise from 1/5 to 1/10 the total volume of the resin in the loading column 10, and each increment is subjected to an amount of regenerating solution corresponding to 15 to 25 times the volume of the resin increment. The regeneration time can range from about 5 to 8 minutes. Massive amounts of regenerant thereby react with each loaded resin increment, effectively replacing the magnesium and calcium ions with hydrogen and ammonium ions. During passage through the resin in the regen chamber, the regenerating solution becomes supersaturated, at least with respect to calcium and magnesium sulfates. However, precipitation within the regen chamber does not occur because of the short contact time. The supersaturated solution is transferred into the crystallizer 16.

During resin regeneration, some phosphoric acid is removed from the resin. As the regenerant is recycled its phosphoric acid will increase to an equilibrium concentration. This is not objectionable. It has been found that the presence of phosphoric acid in the regenerant assists in depressing the solubility of calcium, magnesium, and other metal ions. On a $P_2O_5$ basis, the regenerant solution may contain from 6 to 20% phosphoric acid, or typically from about 8 to 13% at the equilibrium concentration. The cadmium content of the phosphoric acid may also be reduced. Cadmium is adsorbed onto and desorbed from the resin in similar fashion to calcium, and can be removed through a purge stream.

In a presently preferred embodiment, the regenerant solution is maintained at a temperature of from 85° to 100° F., such as about 90° F. On a weight percent basis the recycled regenerant has a free $H_2SO_4$ concentration of 20 to 35%, such as 25%, and concentration of ammonium sulfate of 25 to 35% (e.g. 30%). The degree of saturation of ammonium sulfate is preferably in the range of 65 to 75%, for example about 70% saturation. With these conditions the pH will be below 1.0. On a $P_2O_5$ basis at equilibrium, the regenerant solution will usually contain from about 8 to 12% weight percent $P_2O_5$. By employing the described regenerant with a resin increment representing about 1/7 of the resin volume of the loading column, approximately 20 volumes of the regenerant solution per volume of the resin increment are passed through each increment. The total regeneration time for each increment is about 5 minutes.

We claim:

1. The method of removal and controlled crystallization of metal ions adsorbed on cation exchange resin beads from wet process phosphoric acid, said metal ions including principally calcium and magnesium ions and the resin beads to be treated being pulse increments transferred from a pulsed-bed metal ion adsorption column, wherein the improvement comprises:

(a) establishing a recycle circuit including a container for the resin bead increments to be treated, a crystallizer for precipitation of metal ions, and a liquid reservoir;
    (b) maintaining in said reservoir a regenerant comprising a solution of sulfuric acid ($H_2SO_4$), and ammonium sulfate, said solution containing on a solution weight percent basis from 5 to 50% sulfuric acid and 10 to 40% ammonium sulfate, and being at a pH below 2.0 and at a temperature of from 40° to 125° F. at which said solution is substantially saturated with calcium and magnesium sulfates while being substantially below saturation with ammonium sulfate;
    (c) passing said regenerant through the resin beads in said container to remove calcium, magnesium, and other metal ions by exchanging the adsorbed metal ions for hydrogen and ammonium ions in the regenerant;
    (d) passing the resulting metal ion-containing regenerant from said container into said crystallizer;
    (e) adjusting the sulfuric acid and ammonium sulfate concentration of said metal ion-containing regenerant to the said concentrations being maintained in the reservoir;
    (f) precipitating at least calcium and magnesium sulfates in the form of filterable crystals, the pH in said crystallizer being below 2.0 and there being sufficient $H_2SO_4$ present to co-precipitate the magnesium and calcium sulfates in the form of filterable crystals;
    (g) separating the crystalline precipitate from the regenerant; and
    (h) passing the resulting regenerant to the reservoir for recycle use.

2. The method of claim 1 in which the sulfuric acid and ammonium sulfate concentrations of the regenerant solution in said reservoir are maintained on a solution weight percent basis at from substantially 15 to 25% $H_2SO_4$ and 20 to 40% $(NH_4)_2SO_4$, said sulfuric acid and ammonium sulfate concentration being adjusted by adding $H_2SO_4$ and $NH_3$ to the said metal ion-containing regenerant.

3. The method of claim 1 in which the volume of the regenerant passed through each increment of resin beads is in excess of 10 times the volume of the increment.

4. The method of removal and controlled crystallization of metal ions adsorbed on cation exchange resin beads from wet process phosphoric acid, said metal ions including principally calcium and magnesium ions and the resin beads to be treated being pulse increments transferred from a pulsed-bed metal ion absorption column, wherein the improvement comprises:

(a) establishing a recycle circuit including a container for the resin bead increments to be treated, a crystallizer for precipitation of metal ions, and a liquid reservoir;
    (b) maintaining in said reservoir a regenerant comprising an aqueous solution of sulfuric acid ($H_2SO_4$) and ammonium sulfate, said solution containing on a solution weight percent basis from 5 to 50% $H_2SO_4$, and 10 to 40% $(NH_4)_2SO_4$, said solution also containing 6 to 20% phosphoric acid calculated as $P_2O_5$, being at a temperature of from 70° to 105° F., having a pH below 2.0, and being less than 90% saturated with ammonium sulfate while being substantially saturated with calcium and magnesium sulfates;
    (c) passing said regenerant through the resin beads in said container to remove calcium, magnesium and other metal ions by exchanging the adsorbed metal ions for hydrogen and ammonium ions in the regenerant, the volume of the regenerant passed through each pulse increment being in excess of 10 times the volume of the increment;
    (d) passing the resulting metal ion-containing regenerant from said container into said crystallizer;
    (e) adjusting the sulfuric acid and ammonium sulfate concentration of the metal ion-containing regenerant to the said concentrations being maintained in the reservoir;
    (f) precipitating at least calcium and magnesium sulfates in the form of filterable crystals, the pH in said crystallizer being below 2.0 and there being sufficient $H_2SO_4$ present to co-precipitate the magnesium and calcium sulfates in the form of filterable crystals;
    (g) separating the crystalline precipitate from the regenerant; and
    (h) passing the resulting regenerant to said reservoir for recycle use.

5. The method of claim 4 in which the volume of said regenerant passed through each pulse increment of resin beads is from 15 to 25 times the volume of the increment.

6. The method of claim 1 in which said container for said resin bead increments has a perforated downwardly converging lower portion and said resin beads are retained thereon and distributed over said lower portion in a layer of relatively uniform thickness, said regenerant being passed downwardly through said layer and said perforated lower portion.

7. The method of claims 1, 4 or 6 in which the resin beads being treated in said container comprise a single pulse increment of resin beads transferred to said container from the pulsed-bead ion absorption column.

* * * * *